United States Patent
Yoon

(10) Patent No.: US 7,271,864 B2
(45) Date of Patent: Sep. 18, 2007

(54) COATING TYPE OPTICAL FILM, FABRICATION METHOD THEREOF AND LIQUID CRYSTAL DISPLAY USING THE OPTICAL FILM

(75) Inventor: Sunghoe Yoon, Anyang-si (KR)

(73) Assignee: LG. Philips LCD Co., Ltd, Seoul (KR)

( * ) Notice: Subject to any disclaimer, the term of this patent is extended or adjusted under 35 U.S.C. 154(b) by 53 days.

(21) Appl. No.: 10/748,006

(22) Filed: Dec. 29, 2003

(65) Prior Publication Data

US 2005/0001955 A1   Jan. 6, 2005

(30) Foreign Application Priority Data

Jul. 2, 2003   (KR) .................... 10-2003-44613

(51) Int. Cl.
*G02F 1/1335* (2006.01)
(52) U.S. Cl. ..................... 349/96; 349/117; 349/98
(58) Field of Classification Search .................. 349/96, 349/117, 98; 359/459, 499
See application file for complete search history.

(56) References Cited

U.S. PATENT DOCUMENTS

| | | | |
|---|---|---|---|
| 5,110,623 A * | 5/1992 | Yuasa et al. ................ 427/162 |
| 6,641,874 B2 * | 11/2003 | Kuntz et al. ................ 428/29 |
| 6,853,491 B1 * | 2/2005 | Ruhle et al. ............... 359/630 |
| 6,879,356 B2 * | 4/2005 | Hsieh et al. ................ 349/96 |
| 6,882,386 B2 * | 4/2005 | Moon et al. ................ 349/98 |
| 6,911,238 B2 * | 6/2005 | Okawa et al. ............... 428/1.1 |
| 2001/0022997 A1 * | 9/2001 | Honda et al. .............. 428/1.31 |
| 2003/0128317 A1 * | 7/2003 | Ohmuro et al. ............ 349/113 |

* cited by examiner

*Primary Examiner*—Mike Qi
(74) *Attorney, Agent, or Firm*—Brinks Hofer Gilson & Lione

(57) ABSTRACT

A coating type optical film has a linear polarizer formed on a high brightness optical film such as a circular polarizer formed using cholesteric liquid crystal and a phase difference film or an interference type linear polarizer using a coating method. In forming the linear polarizer by coating liquid crystal on the interference type linear polarizer, the liquid crystal is coated by using a bar coating method, a knife coating method or a slit-die coating method. The coated liquid crystal is lyotropic liquid crystal. The lyotropic liquid crystal can include dye and pigment. The linear polarizer formed in this way has an E-mode polarization.

15 Claims, 6 Drawing Sheets

COATING TYPE OPTICAL FILM, FABRICATION METHOD THEREOF AND LIQUID CRYSTAL DISPLAY USING THE OPTICAL FILM

The present invention claims the benefit of Korean Patent Application No. 2003-44613 filed in Korea on Jul. 2, 2003, which is hereby incorporated by reference for all purposes as if fully set forth herein.

BACKGROUND OF THE INVENTION

1. Field of the Invention

The present invention relates to a coating type optical film, a fabrication method thereof and a liquid crystal display (LCD) using the optical film, and more particularly, to a coating type optical film in which a linear polarizing film is directly coated to form a thin high brightness polarizing plate with an overall thickness of 200 µm. The present invention is also directed to a fabrication method of a coating type optical film and an LCD using the optical film.

2. Description of the Related Art

Today, as we rapidly advance toward an information-oriented society, flat panel displays are required to have excellent characteristics such as slimness, lightness, and low power consumption. In these flat panel displays, since an LCD is excellent in resolution, color display and image quality, it is being actively employed as a monitor of a notebook computer or a desktop computer.

Generally, an LCD is provided with two substrates, each having an electric field generation electrode. The two substrates are arranged such that two surfaces with the electric field generation electrodes face each other. Liquid crystal material is injected into a space between the two substrates. Liquid crystal molecules of the liquid crystal material are aligned by an electric field, which is generated when a voltage is applied to the two electric field generation electrodes, so that light transmittance is changed to display an image.

The general structure of a conventional LCD will be described with reference to the accompanied drawings.

FIG. 1 illustrates structure of a conventional LCD schematically. As shown in FIG. 1, the LCD has a first substrate 110 and a second substrate 120 spaced by a predetermined interval from each other.

The first substrate 110 positioned at the lower side is provided with a thin film transistor T1 including a gate electrode 111, a source electrode 115a and a drain electrode 115b. The thin film transistor T1 further includes an active layer 113 and an ohmic contact layer 114. Here, the gate electrode 111 has an insulating layer 112 thereon.

The thin film transistor T1 is provided with a passivation layer 116 thereon. The passivation layer 116 covers the thin film transistor T1. The passivation layer 116 has a contact hole 116c to expose the drain electrode 115b. Next, the passivation layer 116 has a pixel electrode 117 thereon. The pixel electrode 117 is connected to the drain electrode 115b through the contact hole 116c.

On the other hand, the second substrate 120 has a black matrix 121 on an inner surface thereof at the position corresponding to the thin film transistor T1. Color filters 122a and 122b of red (R), green (G) and blue (B) are orderly arranged beneath the black matrix 121. A common electrode 123 of transparent conductive material is formed beneath the color filters 122a and 122b. Here, each color of the color filters 122a and 122b corresponds to each pixel electrode 117.

A liquid crystal layer 130 is injected between the pixel electrode 117 and the common electrode 123. The alignment of the liquid crystal molecules of the liquid crystal layer 130 is changed by an electric field generated when a voltage is applied to the pixel electrode 117 and the common electrode 123. Here, although not shown in the drawings, alignment films are formed over the pixel electrode 117 and below the common electrode 123 respectively, to decide the initial alignment of liquid crystal molecules.

On the outer surfaces of the two substrates 110 and 120, i.e., beneath the first substrate 110 and on the second substrate, first and second polarizing plates 118 and 124 are arranged, which transmit only the light that is parallel with the light transmission axis to transform natural light into linearly polarized light. Here, the light transmission axis of the first polarizing plate 118 is perpendicular to that of the second polarizing plate 124.

In FIG. 1, although a structure has been described in which the thin film transistor and the pixel electrode are formed on the lower substrate of the LCD and the color filter and the common electrode are formed on the upper substrate, recently a structure has been suggested in which the color filter and the thin film transistor are formed on the lower substrate. Alternatively, an example in which color filter and common electrode are formed on the lower substrate while thin film transistor and pixel electrode are formed on the upper substrate has also been suggested.

However, since the aforementioned LCDs cannot emit light by themselves, a separate light source is required. Accordingly, a backlight is installed at a backside of the liquid crystal panel or below the first polarizing plate 118 shown in FIG. 1. The light emitted from the backlight is incident to the liquid crystal panel and the amount of the incident light is controlled depending on the alignment of liquid crystal molecules so that image is displayed properly. The LCD used for this purpose is called a transmission type LCD. Here, the pixel electrode 117 and the common electrode 123, which are electric field generation electrodes, are formed of transparent conductive material. The two substrates also have to be of transparent substrates.

The polarizing plate used in the LCD transmits one polarization component of the incident light but absorbs the other component. The absorbed component results in heat loss so that 50% or more brightness loss is caused considering reflection at the surface of the polarizing plate.

Accordingly, a structure has been suggested in which a reflective circular polarizer is employed at the lower portion of the LCD to increase the brightness of the LCD by reducing such a loss.

The reflective circular polarizer transmits one circular polarization component of the incident light and reflects the other component of the incident light. The reflected light of the circular polarization component is again reflected while passing through various optical components placed below the circular polarizer, so that the polarization component is converted to a component that can transmit through the circular polarizer and returns to the original location.

In other words, since the overall amount of the incident light is converted to one polarization component and transmitted theoretically, the loss of light caused by the conventional absorption type linear polarizer can be reduced greatly.

FIG. 2 schematically illustrates the structure of a conventional LCD using an optical film. As shown in FIG. 2, a first polarizing plate 202 that is a linear polarizer is disposed below a liquid crystal panel 201 provided with two substrates each having an electrode on an inner surface thereof, and liquid crystal layer injected between the two substrates. Below the first polarizing plate 202, a phase difference film 203 that converts linear polarized light into circular polarized light and vice versa, and a second polarizing plate 205 that is a circular polarizer are disposed. A compensation film 204 can be further disposed between the phase difference film 203 and the second polarizing plate 205. Below the second polarizing plate 205, a sheet 206 for converging and diffusing light and a backlight 207 are disposed respectively. A third polarizing plate 208 having the light transmission axis perpendicular to that of the first polarizing plate 202 is disposed over the liquid crystal panel 201.

The phase difference film and the compensation film are laminated sequentially by adhesive layers 209a, 209b, 209c, 209d and 210.

The liquid crystal panel 201 of the LCD may be configured to have the same structure as the liquid crystal panel of FIG. 1 or not.

Here, the circular polarizer 205 is made by forming a cholesteric liquid crystal layer 205b on a transparent substrate 205a by using cholesteric liquid crystal.

The cholesteric liquid crystal has a selective reflection characteristic to reflect only light having a particular frequency in the incident light according to the helical pitch. Here, the polarization of the reflected light depends on the rotation direction of the liquid crystal molecules. For example, if liquid crystal molecules have a counterclockwise twisted structure (i.e., left-handed structure), only left-circular polarized light is reflected at the corresponding color.

Then, the pitch size of the cholesteric liquid crystal which light experiences is varied depending on the incident angle of the incident light, so that the wavelength of the reflected light changes. Therefore, since color shift in which the color of the light that is not reflected but transmitted in the incident light changes is caused according to the viewing angle of an observer, a compensation film 204 can be disposed on the circular polarizer 205 so as to compensate for the color shift.

Meanwhile, as illustrated in the drawings, the sheet for converging and diffusing the light from the backlight 207 to the liquid crystal panel 201 can be disposed between the circular polarizer 205 and the backlight 207.

As described above, the optical film gets thicker and has lower brightness due to a circular polarizer, a compensation film, a phase difference film and adhesive layers formed between these films.

SUMMARY OF THE INVENTION

Accordingly, the present invention is directed to a coating type optical film, a fabrication method thereof and a liquid crystal display (LCD) using an optical film that substantially obviates one or more problems due to limitations and disadvantages of the related art.

Embodiments of the present invention provide a coating type optical film, fabrication method thereof and a liquid crystal display (LCD) using an optical film in which a linear polarizing film is directly coated to form a thin, high brightness polarizing plate.

Additional advantages and features of the invention will be set forth in part in the description which follows and in part will become apparent to those having ordinary skill in the art upon examination of the following or may be learned from practice of the invention. These and other advantages of the invention may be realized and attained by the structure particularly pointed out in the written description and claims hereof as well as the appended drawings.

To achieve these and other advantages, as embodied and broadly described herein, a liquid crystal display includes a liquid crystal panel having an upper plate, a lower plate and liquid crystal injected between the upper plate and the lower plate. A polarizing plate is disposed on the liquid crystal panel. An optical film contains a linear polarizer that is coated on a surface of the optical film. The linear polarizer has a light transmittance axis perpendicular to the light transmittance axis of the polarizing plate. The optical film is positioned at a bottom surface of the liquid crystal panel.

A coating type optical film coated with the linear polarizer according to the present invention contains a circular polarizer formed using cholesteric liquid crystal, that is, a circular polarizer as a brightness-improved film using regeneration of light. An adhesive layer is formed on the circular polarizer. A phase difference film is formed on the adhesive layer. Herein as described, a first layer being formed on a second layer does not necessarily mean that the first layer is formed in contact with the second layer unless it is formed directly on the second layer. A linear polarizer is coated on the phase difference film.

Alternatively, a coating type optical film includes an interference type linear polarizer as a brightness-improved film using regeneration of light and a linear polarizer coated directly on the interference type linear polarizer.

In forming a linear polarizer by coating liquid crystal on the phase difference film or the interference type linear polarizer, the liquid crystal is coated by any one selected from the group consisting of a bar coating method, a knife coating method and a slit-die coating method, the coated liquid crystal is lyotropic liquid crystal, the lyotropic liquid crystal includes any one selected from the group consisting of dye and pigment, and the formed linear polarizer is E-mode.

The linear polarizer is coated on a separate substrate and adhered on the phase difference film or the interference type linear polarizer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
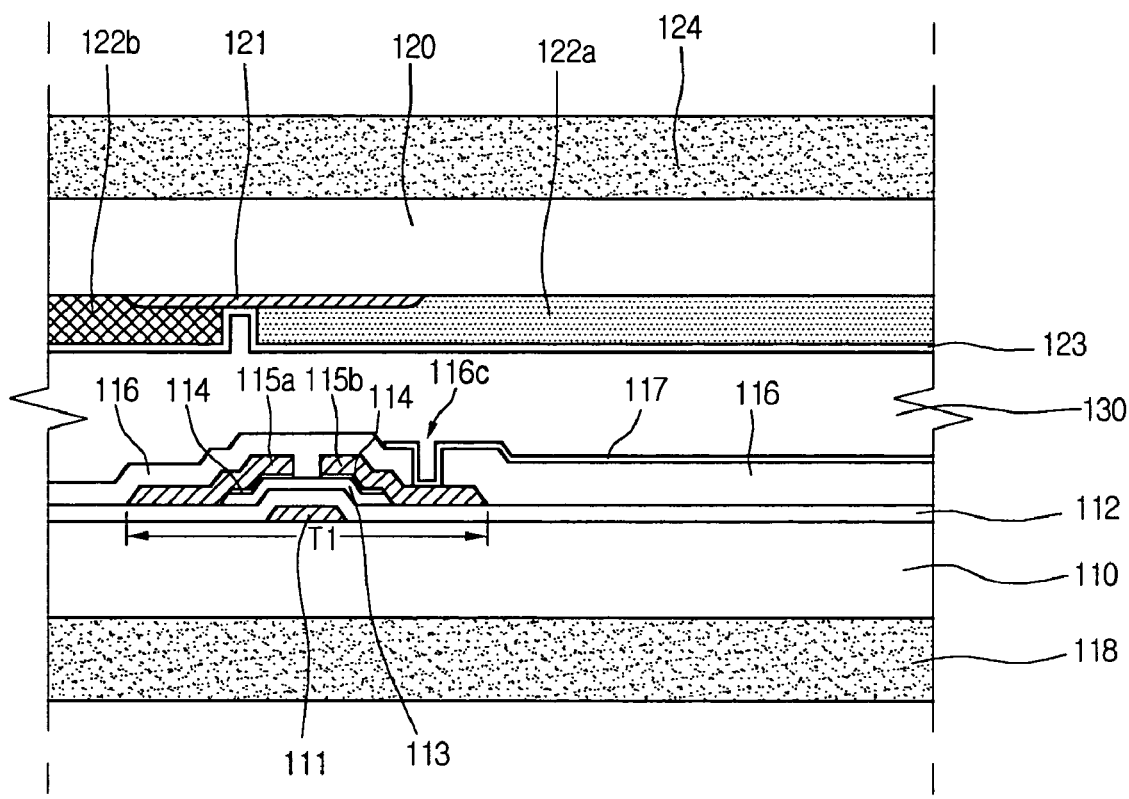
FIG. 1 illustrates the structure of a conventional LCD schematically.
Figure 2:
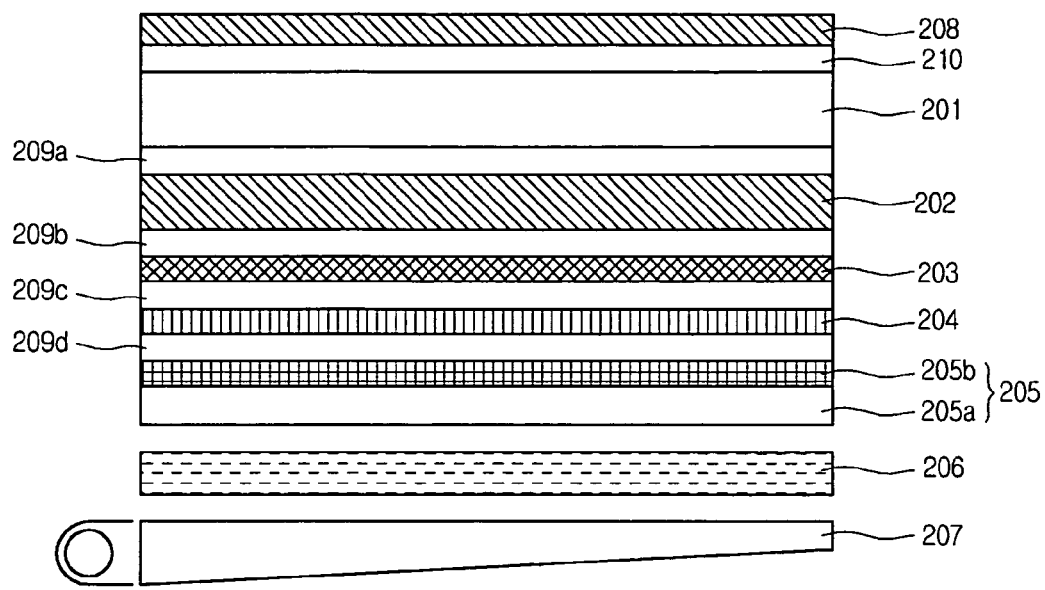
FIG. 2 schematically illustrates the structure of a conventional LCD using an optical film.
Figure 3:
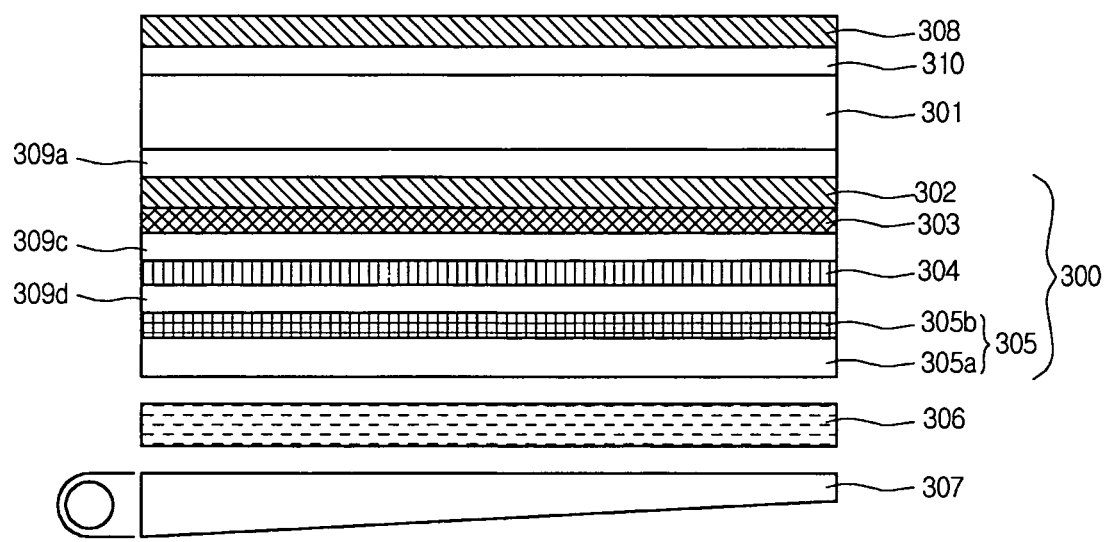
FIG. 3 schematically illustrates an LCD using an optical film according to a first embodiment of the present invention.

FIG. 3 schematically illustrates an LCD using an optical film according to a first embodiment of the present invention.

As illustrated in FIG. 3, a liquid crystal display using a coating type optical film according to the present invention includes: a liquid crystal panel 301 having an upper plate, a lower plate and liquid crystal injected between the upper plate and the lower plate, for driving the liquid crystal by using an electric field; a polarizing plate 308 adhered on the liquid crystal panel 301 using an adhesive layer 310; and an optical film 300 positioned below the liquid crystal panel 301 and coated with a linear polarizer having a light transmittance axis perpendicular to that of the polarizing plate 308.

Also, a sheet 306 for converging and diffusing the light from the backlight 307 toward the liquid crystal panel 301 is disposed between the optical film 300 and a backlight 307.

An optical film 300 positioned below the liquid crystal panel 301, that is, the coating type optical film 300 coated with a linear polarizer having a light transmittance axis perpendicular to that of the polarizing plate 308 includes: a circular polarizer 305 formed using cholesteric liquid crystal; a first adhesive layer 309d formed on the circular polarizer 305; a compensation film 304 formed on first adhesive layer 309d; a second adhesive layer 309c formed on the compensation film 304; a phase difference film 303 formed on the second adhesive layer 309c; and a linear polarizer 302 coated on the phase difference film 303.

Alternatively, the optical film may be attached on a bottom surface of the liquid crystal panel 301 by the third adhesive layer 309a being formed on the coated linear polarizer 302.

Here, the circular polarizer 305 corresponds to an embodiment of a high brightness film to enhance brightness by using regeneration of light.

The circular polarizer 305 is made by forming the cholesteric liquid crystal layer 305b on the transparent substrate 305a by using cholesteric liquid crystal.

The cholesteric liquid crystal has a selective reflection characteristic to reflect only light of a particular frequency in the incident light according to the helical pitch. Here, the polarization state of the reflected light is determined depending on the rotation direction of the liquid crystal molecules. For example, if liquid crystal molecules have a counter-clockwise twisted structure (i.e., left-handed structure), only left-circular polarized light is reflected at the corresponding color.

Then, the pitch size of the cholesteric liquid crystal which light experiences is varied depending on the incident angle of the incident light, so that the wavelength of the reflected light changes. Therefore, since color shift in which the color of the light that is not reflected but transmitted in the incident light changes is caused according to the viewing angle of an observer, the compensation film 304 can be disposed on the circular polarizer 305 so as to compensate for the color shift.

FIGS. 4A through 4D illustrate a method for fabricating a coating type optical film according to a first embodiment of the present invention.

Figure 4A:
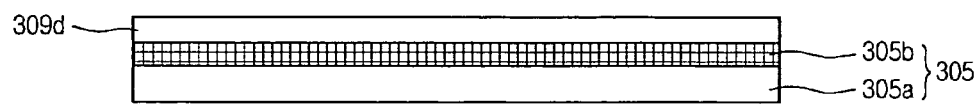
FIGS. 4A through 4D illustrate a method for fabricating a coating type optical film according to a first embodiment of the present invention.

As illustrated in FIG. 4A, first, a circular polarizer 305 is formed on a transparent substrate 305a by using cholesteric liquid crystal 305b.

In more detail, the cholesteric liquid crystal layer 305b can be formed by a bar coating method or a roll coating method, which allows the surface of the cholesteric liquid crystal layer 305b to be made flat so that the cholesteric liquid crystal layer 305b has a uniform thickness.

In other words, when the circular polarizer 305 is formed by the roll coating method, the cholesteric liquid crystal layer 305b passes between a pair of rollers spaced by a predetermined distance from each other to adjust the thickness of the cholesteric liquid crystal layer 305b. The pitch of the cholesteric liquid crystal layer is determined by irradiating light such as ultraviolet light and is then hardened to complete the circular polarizer 305.

Figure 4B:
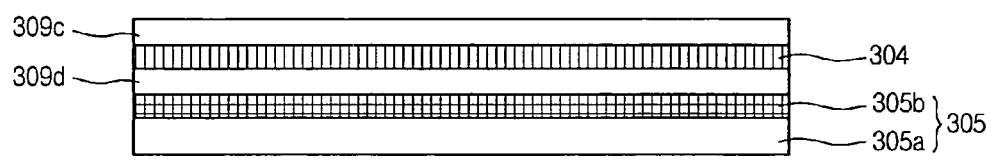

As illustrated in FIG. 4B, a first adhesive layer 309d is formed on the circular polarizer 305 and the compensation film 304 is then formed.

In more detail, the first adhesive layer 309d formed on the circular polarizer 305 is to allow the circular polarizer 305 and the compensation film 304 to be firmly adhered. The compensation film 304 is formed since color shift in which the color of the light that is not reflected but transmitted in the incident light changes is caused according to the viewing angle of an observer.

In case the light emitted from the backlight is converged below 20 degrees, a wide viewing angle can be obtained without a separate compensation film. Hence, in another embodiment the compensation film 304 may not be present.

If the compensation film 304 is present, however, a second adhesive layer 309c is formed on the compensation film 304.

Figure 4C:
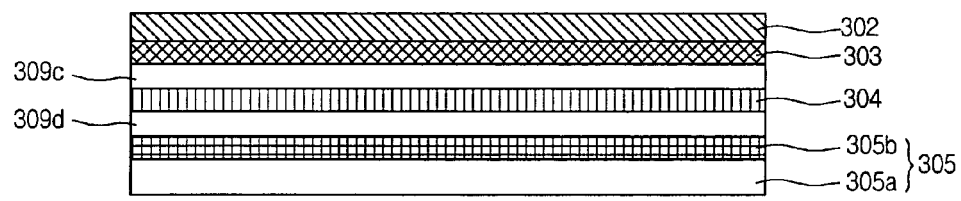

As shown in FIG. 4C, a phase difference film 303 is formed on the second adhesive layer 309c and a linear polarizer 302 is then formed by coating liquid crystal on the phase difference film 303.

The linear polarizer 302 formed on the phase difference film 303 can be formed of a lyotropic liquid crystal which can further include dye or pigment. The liquid crystal is coated by a coating method in which shear force is applied to, such as a bar coating method, a knife coating method or a slit-die coating method. The linear polarizer 302 has an E-mode polarization.

Figure 4D:
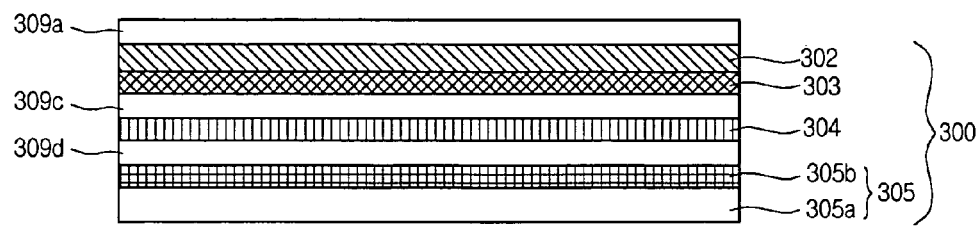

The coating type optical film according to an embodiment of the present invention is fabricated as described above. As shown in FIG. 4D, a third adhesive layer 309a is formed on the linear polarizer 302 of the coating type optical film and the coating type optical film 300 is then adhered on a bottom surface of the liquid crystal panel 301.

Accordingly, by using an optical film as described above, a conventional elongation type PVA-Iodine polarizer of a few hundred μm can be replaced by a coating polarizer of a few μm and thereby the thickness of the optical film is reduced by 100-300 μm.

Figure 5:
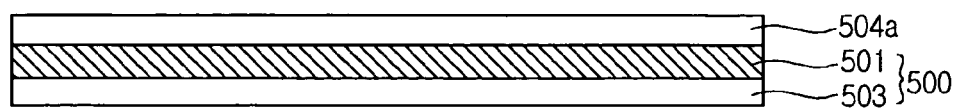
FIG. 5 schematically illustrates a coating type optical film according to a second embodiment of the present invention.

FIG. 5 illustrates a coating type optical film according to a second embodiment of the present invention schematically. As shown in FIG. 5, the coating type optical film 500 according to the present invention, that is, the coating type optical film 500 positioned below the liquid crystal panel includes an interference type linear polarizer 503 and a linear polarizer 501 coated directly on the interference type linear polarizer 501.

The coating type optical film 500 can be adhered to a bottom surface of the liquid crystal panel 301 (shown in FIG. 3) by forming an adhesive layer 504a on the coated linear polarizer 501.

Here, the interference type linear polarizer 503 is an embodiment of a high brightness film to enhance brightness by using regeneration of light. In contrast to the above-mentioned circular polarizer, the interference type linear polarizer 503 does not need a separate substrate when formed.

Figure 6A:
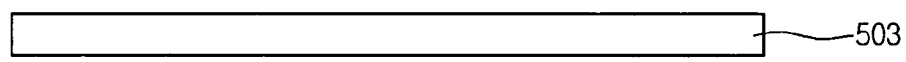
FIGS. 6A and 6B illustrate a method for fabricating a coating type optical film according to a second embodiment of the present invention.
Figure 6B:
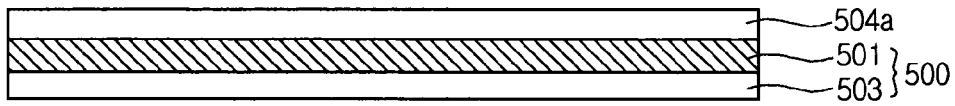

FIGS. 6A and 6B illustrate a method for fabricating a coating type optical film according to a second embodiment of the present invention.

As shown in FIG. 6A, an interference type linear polarizer 503 is prepared. The interference type linear polarizer 503 is not formed by coating a cholesteric liquid crystal layer in the bar coating method or the roll coating method unlike the circular polarizer described in the first embodiment of the present invention. Moreover, the interference type linear polarizer 503 does not need any phase difference film thereon.

When the interference type linear polarizer 503 is prepared, a linear polarizer 501 is coated on the interference type linear polarizer 503 so that the coating type optical film 500 according to the second embodiment of the present invention is formed.

Here, the linear polarizer 501 coated directly on the interference type linear polarizer 503 can be formed of lyotropic liquid crystal that can include dye or pigment. The liquid crystal is coated by a coating method in which a shear force is applied to, such as the bar coating method, the knife coating method or the slit-die coating method. The linear polarizer 501 has an E-mode polarization.

The coating type optical film according to the second embodiment of the present invention is fabricated as described above. As shown in the drawings, an adhesive layer 504a is formed on the linear polarizer 501 of the coating type optical film and the optical film is then adhered to a bottom surface of the liquid crystal panel.

In the coating type optical film according to the first and second embodiments of the present invention, it has been described that the upper linear polarizer 302, 501 is directly coated on a high brightness film such as the circular polarizer 305, the phase difference film 303 or the interference type linear polarizer 503.

Figure 7:
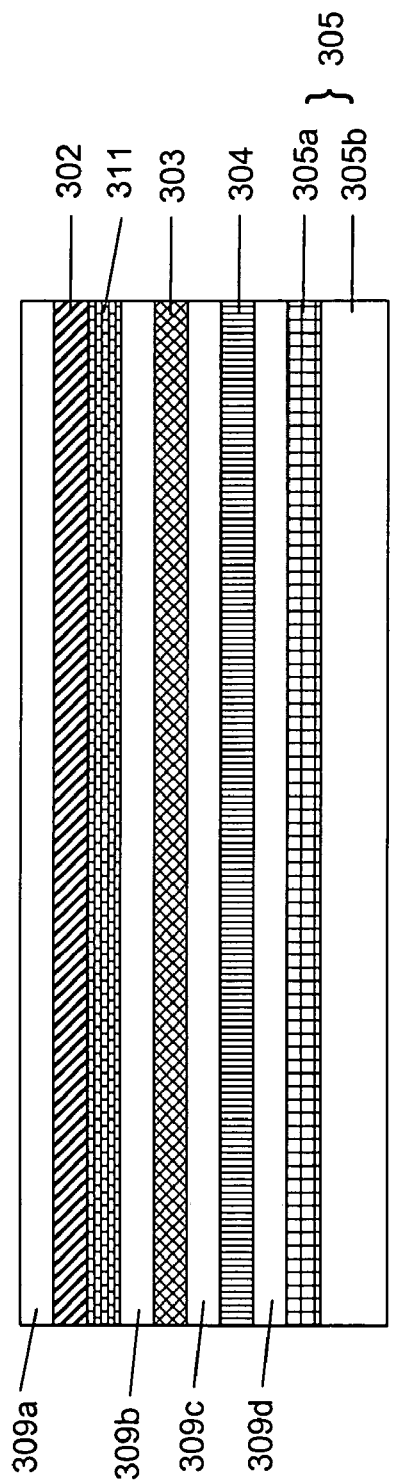
FIG. 7 schematically illustrates an LCD using an optical film according to a third embodiment of the present invention.
Figure 8:
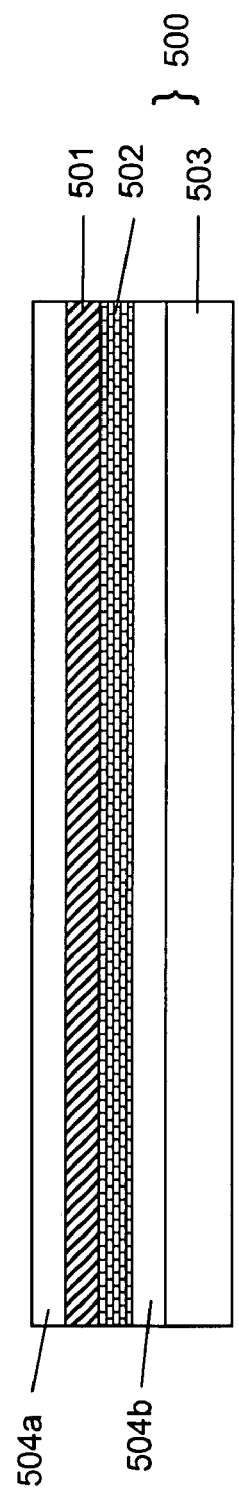
FIG. 8 schematically illustrates an LCD using an optical film according to a fourth embodiment of the present invention.

Alternatively, the linear polarizer 302 and 501 is coated on another suitable substrate (e.g. a plastic substrate) 311, 502 as shown in FIGS. 7 and 8. An adhesive layer 309b, 504b is formed and adhered to an upper surface of the high brightness film, that is, the phase difference film 303 or the interference type linear polarizer 503. As a result, there can be formed a structure of high brightness film+adhesive layer+coated linear film. In other words, the above structure is formed by a method of transferring the coated linear polarizer onto the high brightness film. The linear polarizer may be formed either more proximate or more distal to the liquid crystal panel than the other substrate.

Here, as described above, the linear polarizer can be formed of lyotropic liquid crystal and can further include dye or pigment. The liquid crystal is coated by a coating method in which a shear force is applied to the underlying film, such as a bar coating method, a knife coating method or a slit-die coating method. The linear polarizer 302 has an E-mode polarization.

An adhesive layer may be interposed between the high brightness film and the coated linear polarizer. However, because the adhesive layer is very thin, a thin and high brightness polarizing plate can still be achieved.

Accordingly, using an optical film fabricated as described above, the thickness of the optical film is reduced by 100-300 μm.

In other words, the coating type optical film according to the present invention provides a thin and high brightness polarizing film of about 200 μm or less by directly coating a linear polarizer or forming the linear polarizer in a transferring method on the bright optical film including a circular polarizer or an interference type linear polarizer formed using cholesteric liquid crystal.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display comprising:
    a liquid crystal panel having an upper plate, a lower plate and liquid crystal injected between the upper plate and the lower plate;
    a polarizing plate disposed on the liquid crystal panel; and
    an optical film containing a phase difference film and a linear polarizer contacting the phase difference film,
    wherein the phase difference film and the linear polarizer contacting the phase difference film transmit light to the liquid crystal panel, the linear polarizer has a light transmittance axis perpendicular to a light transmittance axis of the polarizing plate, and the optical film is positioned at a bottom surface of the liquid crystal panel, and the linear polarizer is disposed between the liquid crystal panel and the phase difference film.

2. A coating type optical film comprising:
    a circular polarizer containing cholesteric liquid crystal;
    an adhesive layer formed on the circular polarizer;
    a phase difference film formed on the adhesive layer; and
    a linear polarizer directly coated on the phase difference film,
    wherein the linear polarizer directly coated on the phase difference film transmits light from the circular polarizer to a liquid crystal panel.

3. The coating type optical film according to claim 2, further comprising a compensation film formed between the phase difference film and the circular polarizer.

4. The coating type optical film according to claim 2, wherein the linear polarizer comprises a lyotropic liquid crystal.

5. The coating type optical film according to claim 4, wherein the lyotropic liquid crystal contains dye or pigment.

6. The coating type optical film according to claim 2, wherein the optical film has a thickness of at most about 200 μm.

7. The coating type optical film according to claim 2, wherein the linear polarizer has a thickness of a few μm.

8. A method for fabricating a coating type optical film, comprising:
    (a) forming a circular polarizer containing cholesteric liquid crystal on a transparent substrate;
    (b) forming an adhesive layer on the circular polarizer;
    (c) forming a phase difference film on the adhesive layer; and
    (d) forming a linear polarizer by directly coating liquid crystal on the phase difference film, wherein the linear polarizer formed by directly coating the liquid crystal on the phase difference film transmits light from the circular polarizer to a liquid crystal panel.

9. The method according to claim 8, further comprising:
(e) after (b), forming a compensation film; and
(f) forming another adhesive layer on the compensation film.

10. The method according to claim 8, wherein the liquid crystal is coated by a method selected from the group consisting of a bar coating method, a knife coating method and a slit-die coating method.

11. The method according to claim 8, wherein the coated liquid crystal comprises a lyotropic liquid crystal.

12. The method according to claim 11, wherein the lyotropic liquid crystal contains dye or pigment.

13. The method according to claim 8, wherein the linear polarizer has an E-mode polarization.

14. The method according to claim 8, wherein the optical film has a thickness of at most about 200 μm.

15. The method according to claim 8, wherein the linear polarizer has a thickness of a few μm.

* * * * *